United States Patent [19]

Gagnon

[11] Patent Number: 4,461,542

[45] Date of Patent: Jul. 24, 1984

[54] HIGH EFFICIENCY OPTICAL TANK FOR THREE COLOR LIQUID CRYSTAL LIGHT VALVE IMAGE PROJECTION WITH COLOR SELECTIVE PREPOLARIZATION

[75] Inventor: Ralph J. Gagnon, Chico, Calif.

[73] Assignee: Hughes Aircraft Company, El Segundo, Calif.

[21] Appl. No.: 334,680

[22] Filed: Dec. 28, 1981

[51] Int. Cl.³ .......................... G02F 1/13; G02F 1/00; G03B 21/00

[52] U.S. Cl. ................................ 350/331 R; 353/31; 350/401; 350/403; 350/408; 350/342

[58] Field of Search ................... 350/342, 345, 331 R, 350/401, 403, 408; 353/31, 34, 37; 358/60, 61

[56] References Cited

U.S. PATENT DOCUMENTS

| | | | |
|---|---|---|---|
| 2,403,731 | 7/1946 | MacNeille et al. | 350/395 X |
| 4,019,807 | 4/1977 | Boswell et al. | 350/342 |
| 4,191,456 | 3/1980 | Hong et al. | 350/342 X |

OTHER PUBLICATIONS

Hong et al., II, "Application of the Liquid Crystal Light Valve to a Large Screen Graphics Display", SID, May 8, 1979.

Primary Examiner—John K. Corbin
Assistant Examiner—David Lewis
Attorney, Agent, or Firm—William J. Benman, Jr.; William J. Bethurum; Anthony W. Karambelas

[57] ABSTRACT

A first color selective beam splitter is provided for splitting light from a source into first and second beams, the first beam being blue and the second beam having red and green color components.

A second beam splitter is provided for directing light of the first beam to a blue liquid crystal light valve. The light valve modulates the polarization of the light in the first beam and returns it to the second beam splitter which converts the modulations of polarization to modulations of intensity in the conventional manner and reflects it to a first projection lens.

A third beam splitter is provided for splitting the second beam into third and fourth beams having first and second polarization states, respectively. The third beam is reflected to a red filter. The fourth beam is transmitted through a green filter.

The output of each filter is a substantially monochromatic beam of a single polarization state. The filter outputs are recombined into a single beam which illuminates a fourth beam splitter. The fourth beam splitter is a main polarizing prism. It reflects light of the first polarization state to the green light valve and transmits light of the second polarization state to the red light valve. The light valves modulate the polarization state of incident light in the conventional manner and return it to the main prism. The main prism recombines the light from the first and second light valves into a single beam which is directed to a second projection lens.

5 Claims, 1 Drawing Figure

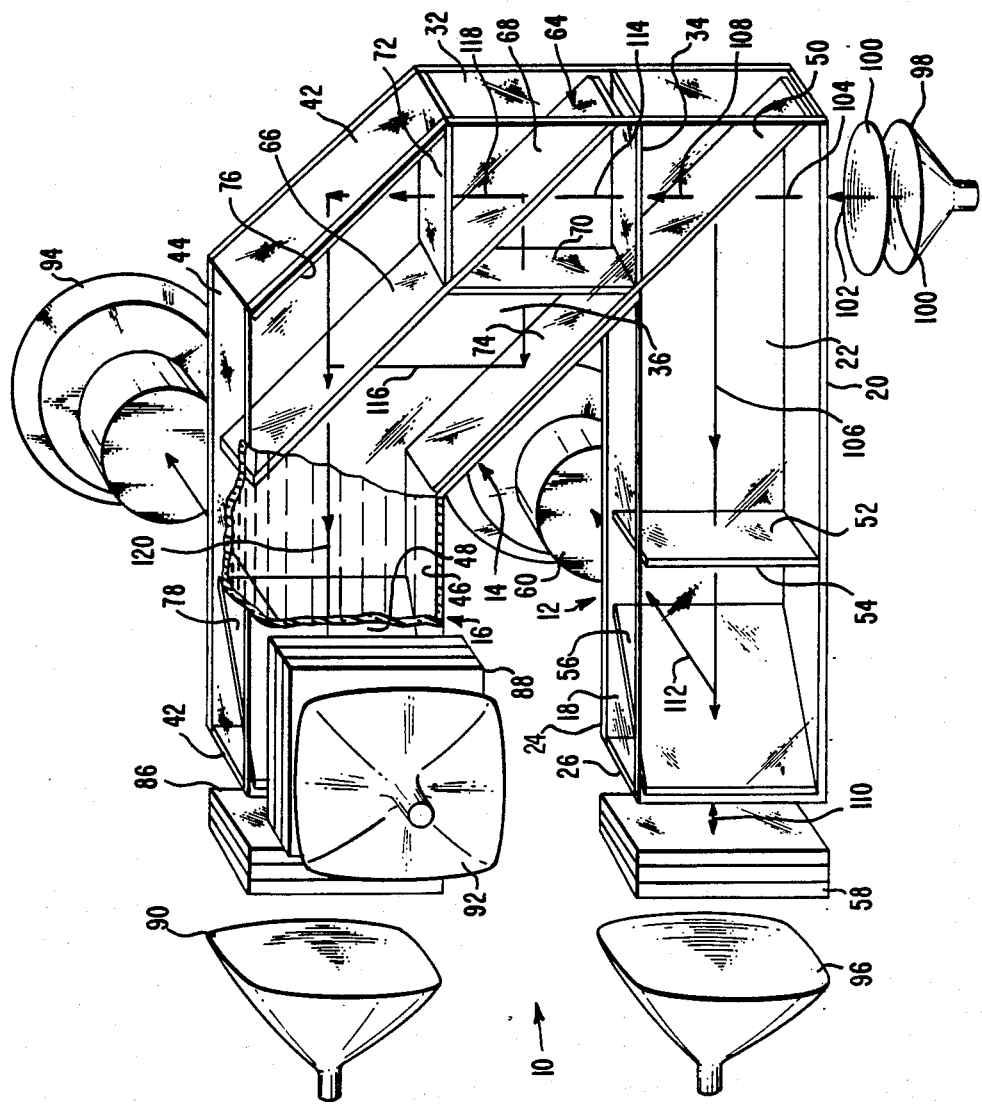

HIGH EFFICIENCY OPTICAL TANK FOR THREE COLOR LIQUID CRYSTAL LIGHT VALVE IMAGE PROJECTION WITH COLOR SELECTIVE PREPOLARIZATION

BACKGROUND OF THE INVENTION

1. Field of the Invention

This invention relates to liquid crystal light valve (LCLV) projectors. Specifically, this invention relates to three color liquid crystal light valve projectors with oil coupled dichroics.

While the present invention will be described herein with reference to a particular embodiment, it is to be understood that the invention is not limited thereto. Those having ordinary skill in the art and access to the teachings of this invention will recognize additional embodiments within the scope thereof.

2. Description of the Prior Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in accordance with the information incident on the photoconductor. Therefore, if a complex distribution of light, for example, a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 disclosed such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display* (SID), International Symposium, Digest of Technical Papers, May 1979, pp. 22-23. This display system, a type with which the present invention is particularly but not exclusively concerned, projects a large scale image having yellow-white characters on a dark blue background. The system includes a cathode ray tube (CRT) which provides input imagery; projection optics which provide the bright collimated output beam and necessary light polarization; and the liquid crystal light valve which interfaces the input and output function.

The system uses a powerful light source such as a xenon arc lamp to illuminate the liquid crystal light valve through collimating and polarizing optics. Light emitted from the xenon arc lamp is transmitted to a main polarizing prism where it is separated into S and P components. The P component passes through the prism while the S component is reflected toward the light valve. Information displayed by cathode ray tube is transferred by fiber optics to one side of the light valve which changes the polarization state from S to P. The light is then transmitted through the prism and imaged on a screen by projection lens. In this capacity, the main prism functions as an analyzer, converting modulations of polarization to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism may, for reasons of cost, be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the beam which illuminates the main prism. The main prism then acts on the beam to substantially remove the residual light of the undesirable polarization state.

However, in some applications it is desirable to use a second liquid crystal light valve for enhanced information displaying capability and versatility. In this application, the use of the prepolarizing prism becomes problematic insofar as the second light valve would require light of the polarization that would otherwise be removed to be the prepolarizing prism. As a result, the use of a second light valve forced a compromise in the quality of the projected image.

This problem was addressed by the Applicant and Roy Cedarstrom in a copending application entitled "Two-Color Liquid Crystal Light Valve Image Projection System with Single Prepolarizer". It provides color selective prepolarization of the light incident upon two or more light valves. This is accomplished by use of a prepolarizing prism which acts on light from a light source to direct light of a first polarization to a first dichroic separator and light of a second polarization to a second dichroic separator. The resulting beams are recombined in a dichroic adder prior to being applied to the main polarizing prism. The main prism directs light of a first color and polarization to a first light valve and light of a second polarization to a second light valve in the conventional manner.

This system, though effective, is bulky insofar as in the best mode, each prism is essentially a small tank with an optical thin film layer immersed in glass or oil. The system of the copending application thus requires air coupling to the immersed beam splitters. The resulting arrangement requires much attention to the proper alignment of the components while offering less than optimal performance. It is known that the coupling of the beam splitters through oil would improve the performance of this system.

U.S. Pat. No. 4,191,456 issued on Mar. 4, 1980 to Hong et al and U.S. Pat. No. 4,127,322 issued on Nov. 28, 1978 to Jacobson et al show full color image projections systems utilizing air coupled components and a plurality of liquid crystal light valves. As a result, these systems are also bulky and through air coupled dichroics offer less than optical performance.

SUMMARY OF THE INVENTION

The present invention substantially overcomes the shortcomings of the prior art and provides full color, high contrast image projection with a relatively simply designed, inexpensive oil coupled optical arrangement.

The invention is a unitary optical arrangement with four beam splitters, two filters and a beam combiner. The first beam splitter separates light from a source into first and second beams with the first beam having a first color component and the second beam having second and third color components.

This second beam splitter is mounted within the container in optical alignment with the first for directing light in the first beam to a first light valve. The light valve modulates the polarization of the light in the first beam and returns it to the second beam splitter where modulations of polarization are converted to modulations of intensity in the conventional manner. The second beam splitter reflects the light to a first projection lens.

The third beam splitter is mounted in optical alignment with the first beam splitter. It separates the second beam into third and fourth beams having first and second polarization states, respectively. The third beam is reflected to a first filter which passes light of a second color. The fourth beam is transmitted to a second filter which passes light of a third color.

The output of each filter is a substantially monochromatic beam of a single polarization state. The filter outputs are recombined into a single beam which illuminates a fourth beam splitter. The fourth beam splitter is the main polarizing prism. It reflects light of the first polarization state to a second light valve and transmits light of the second polarization state to a third light valve. The light valves modulate the polarization state of incident light in the conventional manner and return it to the main prism where it is recombined into a single beam. This beam is directed to a second projection lens.

BRIEF DESCRIPTION OF THE DRAWINGS

The FIGURE is a perspective view of a diagramatic representation of a preferred embodiment of the present invention.

DETAILED DESCRIPTION OF THE INVENTION

As shown in FIG. 1, the invention 10 includes a unitary container suitable for holding optical grade oil having a lower portion 12, a middle portion 14 and an upper portion 16. As discussed more fully below, a plurality of optical components including beam splitters, mirrors and filters are mounted in fixed position within the container 10. The particular method for mounting these components is not critical to the invention. Any number of conventional techniques including the use of grooves and posts, adhesives or premolded construction may be utilized without departing from the scope of the present invention. It is to be understood that one of these techniques is utilized here such that a detailed discussion of the mounting of the optical components is not required.

A dichroic beam splitter 50 is mounted within the lower portion 12 between surfaces 18, 20, 22 and 24 such that its transverse axis extends between surfaces 22 and 24. The beam splitter 50 is designed to act as a blue reflector. It is constructed of glass having an index of refraction n equal to 1.52 and dimensions $3.3'' \times 5'' \times \frac{1}{8}''$. The beam splitter 50 is mounted at a 45° angle to reflect blue S polarized light and transmit red S polarized light and green P polarized light. To achieve this performance, the beam splitter 50 is coated with ten sets of layers, each set having a first layer having a depth of 0.763 quarter wavelength of a material with an index of refraction of 2.05, a second layer having a depth of 1.153 quarter wavelengths of a material having an index of refraction of 1.35 and a third layer having a depth of 0.763 quarter wavelengths and index of refraction of 2.05. This construction is at an optical thickness $\lambda = 385$ nanometers (nm). The beamsplitter 50 is immersed in oil having an index $n = 1.517$.

It should be noted here that cryolite has an index of refraction of 1.35 and zirconium oxide has an index of refraction of 2.05. As such, these components would satisfy the above-identified design criteria for the beam splitter 50. However, other materials may be utilized without departing from the scope of the present invention. For that reason, the remaining optical components will be specified in terms of the required index of refraction and depth only. So long as these design criteria are met, the designer may select any suitable optical material.

The beam splitter 50 not only reflects the blue S component but also serves as a prepolarizer and blue filter as well. Nevertheless, even through it is not theoretically necessary, the preferred embodiment utilizes a blue filter to reject any additional nonblue stray light. The blue pass filter 52 is the first of two coatings on a plate of fused silica or glass having an index of refraction n equal 1.517 dimensions $2.9'' \times 2.9'' \times \frac{1}{8}''$. It is mounted in the lower portion 12 of the container 10 between surfaces 18, 20, 22 and 24 such that it lies in the optical path of the reflected blue S component from beam splitter 50.

It is coated on the first side of the glass in order to achieve this performance with one layer of depth 0.731 quarter wavelength and index of refraction of 2.32 and ten sets of layers each set including one layer of depth of 0.5 quarter wavelength of index of refraction 2.32, one layer one-forth wavelength thick of index of refraction 1.35 and another layer one-half of one-forth wavelength of depth of index of refraction 2.32. The ten sets of layers are then topped with a final layer having a depth of 0.731 quarter wavelength and an index of refraction of 2.32. The construction of the filter 52 is such that the optical wavelength $\lambda$ is equal to 616 nm.

The second side of the glass is coated to provide an ultraviolet filter. The ultraviolet filter 54 has a coating having a first layer of depth 1.236 quarter wavelengths and an index of refraction of 2.32. The first layer is topped with 12 sets of layers, each set having a first layer 0.5 quarter wavelength in depth and index of refraction of 1.46, a second layer having a depth of 1 quarter wavelength and an index of refraction of 2.32 and a third layer having a depth of 0.5 quarter wavelength and an index of refraction of 1.46. The 12 layers are then topped with a final layer having a thickness of 1.236 quarter wavelength and an index of refraction of 2.32.

A second polarizing beam splitter 56 is mounted in the lower portion 12 at a 48° incident angle between surfaces 18, 20, 22, 24 and 26 such that its transverse axis extends between surfaces 18 and 20. As a result, the transverse axis of the second beamsplitter 56 is normal or perpendicular to that of the first beamsplitter 50. For reasons discussed more fully below, this results in improved performance (with regard to efficiency and contrast) and a less bulky arrangement as compared to the more conventional arrangement by which the transverse axes are parallel. The beam splitter 56 is a planar rectangular plate of fused silica or glass having an index of refraction of 1.517 and dimensions 2.5"×3.4"×⅛". It is coated primarily to be highly tranmissive to the P polarized component of the incident light. To achieve this performance, the plate of glass is coated with a first layer having a depth of 1.505 quarter wavelengths and an index of refraction of 2.05. The first layer is topped with 6 sets of layers, each set having a first layer having a depth of 0.909 quarter wavelength and an index of refraction of 1.35, a second layer having a depth of 1.144 quarter wavelengths and an index of refraction of 2.32 and a third layer having a depth of 0.909 quarter wavelength and an index of refraction of 1.35. The 6 layers are topped with a final layer of depth 1.505 quarter wavelengths and an index of refraction of 2.05. The beam splitter 56 is constructed at an optical thickness $\lambda = 350$ nm.

If window apertures are utilized, it is important that the beam splitter 56 be mounted in optical alignment with the aperture for the blue liquid crystal light valve 58 and the first projection lens 60.

A second ultraviolet filter 34 is mounted in the middle portion 14 in optical alignment with the first polarizing beam splitter 50 and in parallel with the surface 20. The second ultraviolet filter 34 is also constructed of a plate of glass such as Schott GG-475 sharp-cut having an index of refraction n equal 1.54 nm. The filter 34 of the preferred embodiment has dimensions of 2.9"×2.9"×⅛". As mentioned above, it is located in the lower portion of the middle portion 14 between surfaces 18 and 28 in the optical path of the first dichroic beam splitter 50 perpendicular to the rays of incident light. It has an optical thin film coating which is effective to reflect or absorb ultraviolet light while passing light in the visible wavelengths. The coating includes a first layer having a depth of 1.49 quarter wavelengths and an index of refraction of 1.92; ten sets of layers, each set having a first layer 0.5 quarter wavelength in depth and an index of refraction of 1.46, a second layer 1 quarter wavelength in depth having an index of refraction of 2.32, and a third layer 0.5 quarter wavelength in depth and an index of refraction of 1.46. The 10 sets of layers are topped with a final layer having a depth of 1.49 quarter wavelength and an index of refraction of 1.55. This construction is at an optical thickness $\lambda = 390$ nm.

A third polarizing beam splitter 64 is disposed in the middle portion 14 and the upper portion 16 at a 48° incident angle. The third beam splitter 64 is designed to provide additional prepolarization of the light passed by the first beam splitter 50. The beam splitter 64 includes an upper portion 66 and a lower portion 68. Each portion is constructed of glass or fused silica such as Schott F-2, glass having an index of refraction of 1.62. The upper prepolarizer has dimensions of 3.7"×2.9"×⅛". The lower prepolarizer has dimensions of 3.9"×2.9"×⅛". The beam splitter 64 is coated on one side with a thin film coating which is effective in transmitting the P polarized component of incident light while reflecting the S polarized component of incident light. The optical thin film coating includes a first layer having a depth of 1.557 quarter wavelengths and an index of refraction of 2.05; a second layer having a depth of 0.994 quarter wavelength and an index of refraction of 1.35; 5 sets of layers, each set having a first layer of depth 1.157 quarter wavelengths and index of refraction of 2.32 and a second layer of a depth of 1.988 quarter wavelengths and an index of refraction of 1.35; a layer of depth 1.157 quarter wavelenths and an index of refraction of 2.32, a layer of 0.994 quarter wavelength and an index of refraction of 1.35 and a final layer of depth 1.557 quarter wavelengths and index of refraction of 2.05. This construction is at an optical thickness $\lambda = 500$ nm.

Two filters or dichroic separators 70 and 72 are mounted within the middle portion 14 between side walls 22 and 24. The first dichroic separator 70 is mounted so that light reflected by the beam splitter 64 is incident at a 0° angle. The second dichroic separator 72 is mounted parallel to the filter 34. Each is mounted to lie in the optical path of the polarization components reflected or transmitted by the third beam splitter 64. Each is constructed of glass having an index of refraction of 1.62, i.e., Schott F-2. The first separator 70 has dimensions 2.9"×2.6"×⅛". The second separator 72 has dimensions 2.9"×2.6"×⅛". The first dichroic separator 70 is coated to act as a red filter for S polarized light at an incident angle of 0°. The coating consists of a first layer of depth 1.228 quarter wavelengths and index of refraction of 2.32; 13 sets of layers, each set including a first layer having a depth of 0.5 quarter wavelength and an index of refraction of 1.46, a second layer having a depth of 1 quarter wavelength and an index of refraction of 2.32, and a third layer having a depth of 0.5 quarter wavelength and an index of refraction of 1.46; and a final layer having a depth of 1.228 quarter wavelengths and an index of refraction of 2.32. The filter is constructed at an optical thickness with $\lambda$ equal to 492 nm.

The second dichroic separator 72 is designed to transmit green P polarized light. Accordingly, the coating includes a first layer having a depth of 0.85 quarter wavelength and an index of refraction of 2.32; 15 sets of layers, each set having a first layer of depth of 0.5 quarter wavelength and an index of refraction of 2.05, a second layer of 1 quarter wavelength in depth having an index of refraction of 1.6 and a third layer of depth 0.5 quarter wavelength and index of refraction of 2.05; and a final layer of depth 0.85 quarter wavelength and index of refraction of 2.32. This coating is constructed at an optical thickness $\lambda$ equal to 640 nm. Each of these filters is designed for use in oil with an index of 1.622.

A first reflector or mirror 74 is disposed in the middle portion 14 between surfaces 46 and 18 and is mounted in parallel with the third beam splitter 64. A second reflector or mirror is mounted in the upper portion 16 between surfaces 44 and 32. It, too, is mounted in parallel with the third beam splitter 64. The first mirror 74 has dimensions of 4.3"×2.9"×⅛". It is constructed of glass, i.e., Schott F-2 having an index of refraction n equal to 1.62 nm.

The second reflector or mirror 76 is the underside of surface 40 and is not shown in FIG. 1. Like the first reflector 74, the upper reflector 76 is designed to be totally reflective. The upper reflector has dimensions of 3.7"×2.9"×⅛". It, too, is constructed of glass, i.e., Schott F-2 having an index of refraction of 1.62. No optical thin film coatings need be applied to either the upper or lower reflector 74 or 76.

A fourth polarizing beam splitter 78 is mounted in the upper portion 16 between top surface 44 and bottom surface 46 and front wall 22 and rear wall 24 not shown. The fourth polarizing beam splitter 78 serves as a main polarizer. It is constructed of glass, i.e., Schott F-2 having an index of refraction n equal 1.62 nm. In the preferred embodiment, the fourth beam splitter has dimensions 3.4"×2.5"×¼".

The fourth beamsplitter 78 is mounted so that its transverse axis is normal to the transverse axis of the upper prepolarizer 66. As a result, the beamsplitter and color separating plates are perpendicular to a common vertical plane in the prepolarizing section while all the plates in the main polarizer are perpendicular to horizontal plane. This results in two advantages. First, this allows the illumination light to be brought in on a vertical line from below the prepolarizers thereby reducing physcial awkwardness. Second, it results in improved polarizing beamsplitter performance. According to calculations the performance improvement significantly obviated the necessity for a trim filter at the light valve and the exit windows.

The 90° twist improves performance because the performance of most currently available polarizers is such that polarization by transmission is more effective than polarization by reflection. That is the prepolarizer 64 reflects S polarized light through the red filter 70 and transmits P polarized light through the green filter 72. Unfortunately, some P polarized light is also reflected to the red filter 70. This means that without the 90° twist red S polarized light and green P polarized light would be delivered as the main polarizer 44. And since for reasons of economy the main polarizer 78 has the same design as the prepolarizer 64. The main polarizer 78 would similarly reflect some green P polarized light to the red light valve. This necessitates the use of a light lowering red trim filter in front of the red light valve to remove the reflected green P exacerbated by the fact that the transmission of green P polarized light to a green light valve in the off state will result in the reflection of the green P polarized light back to the main polarizer 78. Most of this light will pass through the polarizer 78 and return to the illumination system. However, once again some green P polarized light is reflected to the red light valve by the beamsplitter 78. This light reaches the projection screen and lowers image contrast.

Since the 90° twist as the main polarizer 78 interchanges the roles of S and P polarized light, the main polarizer 78 sees green S and red P polarized light. Since there is no green P polarized light present at the main polarizer 78, no trim filter is required at the red light valve. Thus, the system is more efficient and the displayed image is brighter. In addition, no green P is projected on the screen and the displayed image has greater contrast.

To transmit red P and reflect green S polarized light, the coating on beamsplitter 78 consists of a first layer having a depth of 1.557 quarter wavelengths and an index of refraction of 2.05; 6 sets of layers, each set having a first layer of depth 0.994 quarter wavelength and index of refraction of 1.35, a second layer having a depth of 1.157 quarter wavelengths and index of refraction of 2.32 and a third layer having a depth of 0.994 quarter wavelengths and index of refraction of 1.35; and a final layer having a depth of 1.557 quarter wavelength and an index of refraction of 2.05. This construction is at an optical thickness $\lambda = 500$ nm. The design specified above is for an incident angle of 48°.

The fourth beam splitter 78 has beveled edges to allow a close interfit between sides 44 and 48. Windows 80, 82 and 84 (not shown) are mounted on surfaces 42, 48 and 44 to provide fourth, fifth and sixth apertures respectively. These windows are not shown in FIG. 1 for greater clarity. The fourth aperture 80 mounted on surface 42 provides a window for the transmission of the P polarized light to a first liquid crystal light valve 86 and S and P polarization modulated light from the liquid crystal light valve 86 to the fourth polarizing beam splitter 78. The P window is constructed of glass, i.e., Schott F-2, or other suitably transparent material having an index of refraction n euqal 1.62 nm. The window has dimensions of 2"×2"×⅛" in the preferred embodiment and a high efficiency multilayer anti-reflection coating on one side only matched to an index of refraction n equal 1.62 nm. It has a reflection coefficient of less than or equal to 0.75% for a wavelength $\lambda$ between 500 and 700 nm.

The fifth aperture or S window is mounted on surface 48 for transmission of S polarized light to a second liquid crystal light valve 88 and transmission of S and P polarization modulated light from the liquid crystal light valve 88 to the fourth polarizing beam splitter 78. The S window is constructed of glass, i.e., Schott F-2, or other suitably transparent material having an index of refraction n equal 1.62 nm. It has dimensions 2"×2"×⅛" at its narrowest width with a 6° incline to provide a wedge shape. It, too, has a high efficiency multilayer anti-reflection coating on the beveled surface matched to an index of refraction n equal 1.62 nm. It has a reflection coefficient less than or equal to 0.76% for wavelength $\lambda$ between 500 and 700 nm. It is mounted so that its beveled surface faces the light valve. The S and P windows are mounted at an incident angle of zero degrees relative to the fourth polarizing beam splitter 78. The sixth aperture provides an exit window for intensity modulated light from the fourth polarizing beam splitter 78. The exit window 84 is constructed of glass, i.e., Schott F-2, or other suitably transparent material having an index of refraction n equal 1.62 nm. It, too, is mounted at zero degree incidence with its beveled surface facing the exterior of the container 10. It has dimensions of 2.5"×2.5"×⅛" at its narrow end. It, too, has a 6° incline to provide a wedge shape. It has a high efficiency multilayer anti-reflection coating on the upper surface only matched to an index of refraction n equal 1.62 nm. Its reflection coefficient is less than b or equal to 0.75% for wavelength $\lambda$ between 500 and 700 nm.

The invention includes a second projection lens 90 in optical alignment with the exit window 84. In addition, cathode ray tubes 92 and 94 are mounted behind liquid crystal light valves 86 and 88, respectively. FIG. 1 shows cathode ray tube 96 mounted behind liquid crystal light valve 58. FIG. 1 also shows a source of illumination 98 and collimating lens 100, respectively.

In operation, the source 98 emits unpolarized light which is collimated by lens 100 and incident upon surface 20. The incident light illuminates the first dichroic beam splitter 50 where it is separated into two beams. The first beam includes blue S polarized light and is reflected to the blue pass and ultraviolet filters 52 and 54. The blue light is incident upon the second polarizing beam splitter 56 as P polarized light and is transmitted therethrough to the second aperture 26. The blue P polarized light incident upon the second aperture 26 is transmitted therethrough to the first liquid crystal light valve 58. The cathode ray tube 96 writes on the liquid crystal light valve 58 in a conventional manner such that the light valve 58 returns light to the surface 26 which is polarization modulated in accordance with writing light. The light returning to the surface 26 is transmitted on to the first polarizing beam splitter 56 whereupon it is reflected to a first projection lens 60.

The second beam output from the first polarizing beam splitter 50 includes red and green S and P polarized light. The second beam is incident upon the third polarizing beam splitter 64 where it is split into a first beam having primarily S polarized light and a second beam having primarily P polarized light. The S polarized light is reflected onto the red filter 70 while the P polarized light is transmitted onto the green filter 72. The red S polarized light is then reflected by mirror 74 to the upper portion 66 of the second polarizing beam splitter 64. Similarly, the green P polarized light is reflected by second mirror 76 so that it illuminates the upper portion 66 of the polarizing beam splitter 64. The upper portion 66 of the polarizing beam splitter 64 recombines the red S and green P beams into a single beam which illumuinates the fourth polarizing beam splitter 78. The fourth polarizing beam splitter or main prism is mounted so that its transverse axis is normal to that of the upper polarizer 66 such that light which is S polarized as to the polarizer 64 is P polarized as to the main prism 78. Similarly, light that is P polarized as to the prepolarizer 64 is S polarized as to the main polarizer 78. Thus, the red light is P polarized and the green light is S polarized as to the main polarizer 78. The red P polarized light is transmitted through surface 42 to the second liquid crystal light valve 86 where it is polarization modulated in the conventional manner. Similarly, the green S polarized light is reflected to the second liquid crystal light valve 88 where it is polarization modulated in the conventional manner. The polarization modulated light is returned to the main polarizer 78 where it is recombined into a single beam and incident upon projection optics 90 in a conventional manner.

The present invention has been described with reference to particular embodiments in a particular application. It is understood that other designs of the container may be utilized without departing from the scope of the present invention. It should be noted that many of the optical components described above were designed and performance evaluated by the Thin Film computer program provided as a service of the Genesee Company of Rochester, N.Y. It is also understood that certain modifications can be made with regard to the selection of polarization components to be filtered by the red and green filters, respectively. In addition, other dichroic filters may be utilized without departing from the scope of the invention. As mentioned above, the prepolarizing beam splitter need not be an unitary beam splitter but may, instead, be two separate prepolarizing beam splitters. The invention of the preferred embodiment is immersed in an optical grade oils of indices of refraction of 1.517 and 1.622. Other indices of refraction may be chosen in accordance with a particular design of the system without departing from the scope of the invention. Moreover, solid glass or fused silica may be used instead of oil. Finally, the surfaces which have been specified as being coated may be coated with any number of materials which provide the characteristics called for without departing from the scope of the invention. It is anticipated by the appended claims to cover these and any other such modification within the scope of the invention.

What is claimed is:

1. A unitary optical arrangement comprising:
   a first beamsplitter which splits incident light passing through a first surface into first and second beams, said first beam having a first color component and said second beam having second and third color components, respectively;
   a second beamsplitter mounted in optical alignment with said first beamsplitter which directs light of said first color to a second surface and modulated light from said second surface to a third surface;
   a third beamsplitter in optical alignment with said first beamsplitter which splits said second beam into third and fourth beams having first and second polarization states, respectively;
   a first filter which transmits light of the second color in the third beam to provide an output beam having the second color and the first polarization state;
   a second filter which transmits light of the third color in said fourth beam to provide an output beam having the second polarization state and the third color;
   means for combining the outputs of said first and second filters into a fifth beam; and
   a fourth beamsplitter which directs light in the fifth beam of the first polarization state a fourth surface, light of the second polarization state to a fifth surface and modulated light from said fourth and fifth surfaces to a sixth surface.

2. A multi-color image projection system comprising: first means for providing a source of light energy; first, second and third liquid crystal light valves; first, second and third means for providing an optical input signal for use in combination with said first, second and third liquid crystal light valves; first and second projection lens; and a unitary optical arrangement including:
   a first beamsplitter which splits incident light from said source into first and second beams, said first beam having a first color component and said second beam having second and third color components, respectively;
   a second beamsplitter mounted in optical alignment with said first beamsplitter which directs light of said first color to said first light valve and modulated light from said first light valve to said first projection lens;
   a third beamsplitter in optical alignment with said first beamsplitter which splits said second beam into third and fourth beams having first and second polarization states respectively;
   a first dichroic filter which transmits light of the second color in the third beam to provide an output beam having the second color and the first polarization state;
   a second dichroic filter which transmits light of the third color in the fourth beam to provide an output beam having the second polarization state and the third color;
   means for combining the outputs of said first and second dichroic filters into a fifth beam;

a fourth beamsplitter which directs light in the fifth beam of the first polarization state to the second light valve, light of the second polarization state to the third light valve and modulated light from said second and third light valves to the second projection lens.

3. The optical arrangement of claim 2 wherein the first and third beamsplitters have parallel transverse axes relative to which the transverse axes of the second and fourth beamsplitters are oriented at an angle of 90°.

4. The optical arrangement of claim 3 wherein the beamsplitters, separators and means for combining are coupled through oil.

5. The optical arrangement of claim 2 wherein said means for providing an optical input signal include cathode ray tubes.

* * * * *